Patented June 16, 1942

2,286,222

UNITED STATES PATENT OFFICE 2,286,222

INSECTICIDAL COMPOSITION

Clarence L. Moyle and Fred W. Fletcher, Midland, Mich., assignors to The Dow Chemical Company, Midland, Mich., a corporation of Michigan No Drawing. Application March 11, 1940, Serial No. 323,388

20 Claims. (Cl. 167—24)

This invention relates to insecticides and is particularly concerned with a composition comprising as an active toxicant a mixture of an organic thiocyanate with an aromatic-aliphatic ether compound.

The extracts of insecticidal plant products are widely used for the control of insect pests. Pyrethrin-containing sprays are known to have a quick but temporary paralyzing action on flies and similar insects. Where it is possible to collect and destroy paralyzed insects immediately after treatment, the use of pyrethrin has proved adequate, but, generally speaking, the kill obtained therewith is low compared to the knockdown. Compositions comprising rotenone or derris resins give a more nearly permanent control but are relatively slow in their action. A further disadvantage in the use of rotenone lies in its relative insolubility in petroleum fractions and other solvents commonly employed as constituents of insecticidal compositions. Both of the above-mentioned plant toxicants also suffer from the disadvantage that they are unstable to light and air and, upon storage, lose their effectiveness to a considerable degree.

Many synthetic organic compounds have been proposed as substitutes for the foregoing insecticidal plant toxicants. Almost without exception, however, the high concentrations of such synthetic toxicants required to obtain adequate control give rise to problems of irritation and odor. For example, the use of organic thiocyanates at recommended concentrations imparts to insecticidal compositions an odor frequently of such intensity as to cause irritation of the mucous membrane and nasal passages. Similarly, the synthetic ether compounds have been found objectionable with the added disadvantage that such high concentrations are frequently required to accomplish commercial pest control as make their use economically impractical. A further objection to the use of these two classes of compounds is their specificity of action, whereby an adequate control is obtained against one type of insect, while a closely related pest may be substantially unaffected by compositions comprising such toxicant. These recognized shortcomings, with respect to the synthetic toxicants under consideration, have prejudiced their use, leaving the pest control industry largely dependent upon the vegetable extracts.

Among the objects of the present invention is to provide an improved composition for exterminating common agricultural and household insect pests. It is a further object to provide such a composition which will be more quickly and more permanently toxic to insects than many compositions at present employed. An additional object is to provide a contact insecticide which will kill a percentage of insects approaching the knockdown or moribund control initially obtained upon application of the composition. A still further object is to provide a composition readily synthesizable in any desired amount which will not be characterized by the objectionable odor and irritating properties with which related toxicants have heretofore been identified. Yet another object is to provide a composition which will have an increased effectiveness against a wide variety of insect pests. A further object is to provide mixed toxicant materials which will be compatible with the common insecticidal plant extracts, which will serve as a solubilizing agent for such products as rotenone, which will stabilize insecticidal plant products against deterioration and degradation, and which will have such characteristics of toxicity towards insects in general that they may be substituted wholly or in part for the plant extract toxicants at present commonly employed in insecticidal sprays and dusts.

We have discovered that when an organic thiocyanate is combined with a synthetic ether compound having the formula:

$$R\text{—}(O\text{—}C_nH_{2n})_m\text{—}X$$

wherein R represents an aromatic radical, $n$ is an integer from 2 to 6, inclusive, $m$ is an integer not greater than 4, and X is selected from the group consisting of chlorine, bromine, iodine, and the hydroxyl radical, an improved insecticidal toxicant composition is obtained. When the materials are combined in suitable proportion and the mixture employed in amount such that the concentration of each constituent in the ultimate dilute composition is below that normally causing objectional odor or irritation, there is obtained an efficient control over a wider range of insect pests than is possible with either compound alone. A further advantage is that there is no accompanying additive effect with respect to odor and irritation. The knockdown resulting from the use of such mixed products is high and quick and is closely approximated by the eventual kill. These mixed toxicants are relatively stable and when exposed to light and air do not undergo changes leading to an appreciable reduction in effectiveness.

Additional features of the invention reside in the combination of the above-described toxicant mixtures with pyrethrin- or rotenone-containing plant extracts or both. Compositions comprising the mixed synthetic and plant toxicants are substantially odorless, stabilized against decomposition by light and air, and have both a high kill and knockdown. In combination with derris extract and the like, the ether-thiocyanate mixture speeds up the action of the rotenone and further serves as a solubilizing agent. The combination of the toxicant mixture with both pyrethrin and rotenone results in an insecticidal product of unusually desirable characteristics which is useful both as a contact and stomach poison against a wide variety of insect pests.

In the control of agricultural insect pests, the mixed toxicants with which the present invention is concerned may be employed as constituents of either spray or dusting compositions. For example, they may be employed in oil emulsions either dissolved in the oil or dispersed in the aqueous phase. They may also be employed in water suspensions along with a suitable wetting or dispersing agent, if desired. In a further adaptation, they may be absorbed in or adsorbed on finely divided carriers, such as diatomaceous earth, bentonite, talc, wood flour, and the like, to obtain compositions adapted to be employed either as dusts or to be dispersed in water. Similarly, the mixed products may be incorporated in other standard type insecticidal compositions either as the sole toxic ingredient of such composition or in combination with common insecticidal materials.

In preparing our new toxicant mixtures, 100 parts by weight of the ether compound is incorporated with from about 25 to about 400 parts by weight of the organic thiocyanate. Such mixture is then compounded with various carriers and diluents, the amount of the mixed toxicant employed ranging between approximately 0.1 and 20 per cent by weight of the ultimate composition depending upon the manner in which it is to be applied. When employed in water dispersion, from about 1 to 5 pounds of the mixed toxicant in each 100 gallons (U. S.) of spray material is preferred. In household spray compositions, the mixed toxicants are generally dissolved in sufficient of a petroleum distillate or other non-corrosive organic solvent that a concentration from about 0.25 to about 4 parts by weight is obtained. In combination with pyrethrins, or rotenone, or both, the amount of the mixed toxicant employed in such spray preferably ranges between about 0.25 and about 3 per cent by weight of the ultimate spray composition. When solid carriers are employed as diluents, from about 1 to about 20 parts by weight of the toxicant mixture is intimately mixed with 80 parts of the carrier depending upon whether the resulting product is to be employed as a dust or dispersed with water.

The phrase "non-corrosive organic solvent" as herein employed refers to any organic solvent material non-reactive with and capable of dissolving the toxicants hereinbefore described, and non-injurious to the skin and general health of humans. Representative of such solvents are petroleum distillates, ethylene chloride, methylethyl ketone, hydrogenated naphthalene, dichloro-diethyl ether, methyl, ethyl, propyl, and butyl alcohol. While the foregoing remarks have referred in certain instances to rotenone and pyrethrin, it is to be understood that these terms are inclusive of any pyrethrin-containing plant extract, and of derris, cubé, barbasco, timbo, and other products comprising rotenone and related toxicant materials.

Throughout the examples the petroleum distillate employed is a fraction having a boiling range of 345°–508° F. and a flash point of 137° F. Fly spray testing results were generally compared with those obtained with an "official test insecticide," which in the present instance consists of 0.1 gram of active pyrethrin dissolved in 100 milliliters of the foregoing petroleum distillate. A typical result obtained for this control solution against three-day old house flies, according to the Peet Grady method substantially as described in Soap 8, No. 4, 1932, was 98.2 per cent knockdown in ten minutes and 24.5 per cent kill in 48 hours.

The invention is illustrated by the following examples, in each of which the figures for knockdown and kill were determined substantially according to the Peet Grady method, supra. In each of these examples the indicated amounts of the various toxicant materials were dissolved in sufficient of the petroleum distillate as identified above to obtain 100 milliliters of spray composition.

Example 1

| | Grams |
|---|---|
| Beta-carvacryloxy-ethyl thiocyanate | 1.5 |
| Beta-(4-tertiarybutyl-phenoxy)-ethanol | 1.5 |

The petroleum distillate dilution of this toxicant mixture was not characterized by any objectionable odor or irritation and gave a knockdown of 99 per cent in ten minutes and a kill of 65 per cent in 48 hours.

Example 2

| | Grams |
|---|---|
| Beta-(2.4.6-trichlorophenoxy)-beta'-thiocyano diethyl ether | 1.5 |
| Beta-(2-bromo-4.6-dichlorophenoxy)-beta'-chloro diethyl ether | 1.5 |

When compounded with sufficient petroleum distillate to form 100 milliliters of spray composition the foregoing mixture knocked down 100 per cent of the test insects in ten minutes and gave a kill of 88 per cent in 48 hours. The composition had little if any odor attributable to the synthetic toxicant and was substantially non-irritating to the eyes, nose, and throat.

Example 3

| | Grams |
|---|---|
| Beta-(2.4.6-trichlorophenoxy)-beta'-thiocyano-diethyl ether | 1.5 |
| Beta-(2.4.6-trichlorophenoxy)-beta'-chloro-diethyl ether | 1.5 |

The solution embodying this toxicant mixture was substantially the equivalent of those set forth in Examples 1 and 2 as regards odor and irritation, and gave a knockdown in ten minutes and kill in 48 hours of 97 per cent and 83 per cent respectively.

Example 4

| | Grams |
|---|---|
| Gamma-(2-cyclohexyl-phenoxy-propyl thiocyanate | 1.5 |
| Beta-(2.4.6-trichlorophenoxy)-beta'-chloro-diethyl ether | 1.5 |

This composition was diluted in the usual manner with petroleum distillate, whereby there was obtained a composition giving a knockdown of 98 per cent in ten minutes and a kill of 68 per cent in 48 hours. The composition was not characterized by objectionable properties of odor and irritation.

Example 5

| | Grams |
|---|---|
| Beta -(2.4.6 - trichlorophenoxy) - beta' - thiocyano-diethyl ether | 1.5 |
| Beta - (4 - tertiarybutyl - phenoxy) - beta' - chloro-diethyl ether | 1.5 |

A petroleum distillate dilution of this composition gave a knockdown of 100 per cent in ten minutes and a kill of 74 per cent in 48 hours. No problem of odor or irritation was observed for this composition.

Example 6

| | | |
|---|---|---|
| Beta-(normal - butoxy) -beta'-thiocyano-diethyl ether | ml | 0.5 |
| Beta - (2.4.6 - trichlorophenoxy) - beta' - chloro-diethyl ether | gram | 0.833 |
| Rotenone | do | 0.0125 |
| Pyrethrins | do | 0.028 |

The foregoing mixture of toxicants was made up to 100 milliliters with the usual petroleum distillate to obtain a substantially non-irritating composition giving a knockdown of 99.8 per cent in ten minutes and a kill of 42.4 per cent in 48 hours against three-day old house flies according to the Peet Grady method. There was no problem of objectionable odor and irritation.

Example 7

| | | |
|---|---|---|
| Beta - (4 -tertiarybutyl - phenoxy) - ethyl thiocyanate | ml | 1.0 |
| Beta - (2.4.6 - trichlorophenoxy) - beta' - chloro-diethyl ether | gram | 0.833 |
| Rotenone | do | 0.0125 |

In this composition the rotenone was first added to a mixture of the synthetic toxicants which served as a solubilizing agent in obtaining a quick dispersion in the petroleum distillate. The composition gave a knockdown of 99.2 per cent in ten minutes and a kill of 59.3 per cent in 48 hours, and is not characterized by any properties of objectionable odor and irritation.

Example 8

| | | |
|---|---|---|
| Gamma - (2 - cyclohexyl-phenoxy) - propyl thiocyanate | ml | 1.0 |
| Beta - (2.4.6 - trichlorophenoxy) - beta' - chloro-diethyl ether | gram | 0.833 |
| Pyrethrin | do | 0.028 |

A petroleum distillate dilution of this composition gave a knockdown of 98.4 per cent in ten minutes and a kill of 49.3 per cent in 48 hours.

Example 9

| | | |
|---|---|---|
| Lauryl thiocyanate | ml | 1.0 |
| Beta - (4 - tertiarybutyl - phenoxy) -ethanol | gram | 0.833 |
| Pyrethrin | do | 0.028 |
| Rotenone | do | 0.0125 |

In this composition the mixture of the lauryl thiocyanate and hydroxy-alkyl ether served as a solubilizing agent for the rotenone. The diluted composition gave a knockdown of 98 per cent in ten minutes and a kill of 71.4 per cent in 48 hours against three-day old house flies. The odor and irritation were negligible.

Example 10

| | | |
|---|---|---|
| Beta-(2.4.6-trichlorophenoxy) -beta'-thiocyano-diethyl ether | ml | 1.0 |
| Beta - (2.4.6 - trichlorophenoxy) - beta' - chloro-diethyl ether | gram | 0.833 |
| Pyrethrin | do | 0.028 |
| Rotenone | do | 0.0125 |

Here again the solubilizing action of the synthetic ether product served to accomplish the dispersion of the rotenone to obtain a petroleum distillate composition giving a knockdown of 99.7 per cent in ten minutes and a kill of 77.2 per cent in 48 hours. No objectionable characteristics of odor or irritation were observed.

Other ether compounds which may be substituted for those shown in the examples include beta -(tertiary-octyl - naphthoxy) - ethanol, beta-(4-tertiary-amyl-phenoxy) -ethanol, beta-(4-tertiary-octyl-phenoxy) - ethanol, beta-(2-chloro-4-tertiarybutyl-phenoxy) -ethanol, beta-(2-cyclohexyl-phenoxy)-ethanol, beta-hydroxy ethyl ether of 3-chloro-4-hydroxy-benzophenone, beta-(2.4 - diethyl - phenoxy) - ethanol, beta -(4 - secondary - butyl - phenoxy) - ethanol, gamma-(3-phenyl-phenoxy) -propanol, beta-(caproyl-phenoxy) - ethanol, gamma - (2 - chloro - 6 - phenyl-phenoxy) -propanol, gamma-(2-cyclohexyl-phenoxy) -propanol, gamma - 2.4.6 - trichloro - phenoxy)-isobutanol, (3-phenyl-phenoxy) -butanol, (4-tertiary-butyl-phenoxy)-pentanol, (2-cyclohexyl-phenoxy)-hexanol, beta-(4-tertiary-octyl-phenoxy)-beta'-hydroxy-diethyl ether, beta-(4-tertiary - octyl - phenoxy) - beta' - (2 - hydroxy-ethoxy)-diethyl ether, beta-(2-phenoxy-ethoxy) - beta'-(2-hydroxy-ethoxy)-diethyl ether, beta-(carvacryloxy)-ethyl bromide, beta-(4-tertiary-butyl-phenoxy)-ethyl chloride, beta-(2-bromo-4-ethyl-phenoxy)-ethyl chloride, beta-(4-bromo-phenoxy)-ethyl chloride, beta-(4-chloro-phenoxy)-propyl chloride, gamma-(2.4.6-trichloro-phenoxy) - propyl chloride, gamma - (2-cyclohexyl - phenoxy) -propyl bromide, gamma-(4-chloro-phenoxy)-isobutyl chloride, gamma-(2-chloro-4-tertiarybutyl-phenoxy)-isobutyl chloride, delta-(4-chloro-phenoxy)-butyl chloride, (4-tertiarybutyl-phenoxy)-amyl chloride, (4-tertiarybutyl-phenoxy)-hexyl chloride, gamma-(2-phenyl-phenoxy)-propyl chloride, gamma-(2-methoxy-phenoxy)-isobutyl chloride, gamma-(naphthoxy)-isobutyl chloride, beta-phenoxy-beta'-chloro-diethyl ether, beta-phenoxy-beta' iodo-diethyl ether, beta-(2.4.6-trichlorophenoxy)-beta'-iodo-diisopropyl ether (boiling at 180°-185° C. at 4 mm. pressure), beta-(2-cyclohexyl-phenoxy)-beta'-chloro-diethyl ether, beta-phenoxy-beta'-(2-chloro-ethoxy)-diethyl ether (boiling at 162°-163° C. at 3 mm. pressure), beta-(4-chloro-phenoxy)-beta'-(2-chloro-ethoxy)-diethyl ether (boiling at 185°-186° C. at 4 mm. pressure), beta-(2-phenoxy - ethoxy)-beta'-(2-chloro-ethoxy)-diethyl ether (boiling at 190°-196° C. at 3 mm. pressure), beta-(2-phenoxy-ethoxy)-beta'-(2 - iodo - ethoxy)-diethyl ether, and the like.

Thiocyanates which are the equivalent for those disclosed in the foregoing compositions include beta-(thymyloxy)-ethyl thiocyanate, beta-(3-phenyl-phenoxy)-ethyl thiocyanate, gamma (2.4 - ditertiarybutyl - phenoxy) - propyl thiocyanate, gamma-(2-chloro - 4 - tertiarybutyl - phenoxy)-isobutyl thiocyanate, beta-(2-benzyl-phenoxy)-beta'-thiocyano-dipropyl ether, gamma-(2-aceto - phenoxy)-gamma'-thiocyano-dipropyl ether, n-butyl thiocyanate, secondary-octyl thiocyanate, cyclohexyl thiocyanate, benzyl thiocyanate, ethoxy-ethyl thiocyanate, beta-thiocyano-ethyl laurate, ethyl beta-thiocyano-propionate, diethyl thiocyanomalenate, dithiocyano styrene, alpha - alpha - bis - (beta-thiocyanoethoxy) propane, beta-thiocyano-ethyl-butyl ether, beta-thiocyano-beta'-(ethoxyacetoxy)-diethyl ether, beta—thiocyano-beta'-furoxy-diethyl ether, 4- thiocyano-aniline, 4-thiocyano-toluidine, 4-thiocyanodimethylaniline, thiocyano-alpha-naphthol, dithiocyano-diphenylamine, and the like.

The compositions upon which the present invention is predicated may be applied for the control of such household pests as flies, mosquitoes, clothes moths, carpet beetles, and roaches. Among the agricultural insects susceptible to the mixed toxicant compositions are aphids, mites, thrips, mealy bugs, Colorado potato beetle, Mexican bean beetle, codling moth, walnut worm, army worm, tent caterpillar, and black scale.

Other modes of applying the principle of our invention may be employed instead of those explained, change being made as regards the materials or amounts thereof employed, provided the products set forth in the following claims or the equivalent thereof be thereby obtained.

We therefore particularly point out and distinctly claim as our invention:

1. An insecticidal composition comprising an organic thiocyanate and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

2. An insecticidal composition comprising as active toxicants a material selected from the group consisting of the pyrethrins and rotenone, an organic thiocyanate, and a synthetic ether compound having the formula:

$$R—(O—C_nH_{2n})_m—X$$

wherein R represents an aromatic radical, $n$ is an integer from 2 to 6 inclusive, $m$ is an integer not greater than 4, and X is selected from the group consisting of chlorine, bromine, iodine, and the hydroxyl radical.

3. An insecticidal composition comprising a pyrethrin, an organic thiocyanate, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

4. An insecticidal composition comprising rotenone, an organic thiocyanate, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

5. An insecticidal composition comprising a pyrethrin, rotenone, an organic thiocyanate, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

6. An insecticidal composition comprising an aliphatic thiocyanate and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

7. An insecticidal composition comprising an organic thiocyanate the formula of which contains an aromatic radical, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

8. An insecticidal composition comprising an organic thiocyanate of the formula:

$$R—(O—C_nH_{2n})_m—SCN$$

wherein R represents an aromatic radical, $m$ is an integer not greater than 4, and $n$ is an integer from 2 to 6, inclusive, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

9. An insecticidal composition comprising an organic thiocyanate having the formula:

$$R—O—R'—SCN$$

wherein R represents an aromatic radical of the benzene series, and R' represents an alkylene radical, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

10. An insecticidal composition comprising an organic thiocyanate having the formula:

$$R—O—R'—O—R'—SCN$$

wherein R represents an aromatic radical of the benzene series, and R' represents an alkylene radical, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

11. An insecticidal composition comprising an organic thiocyanate having the formula:

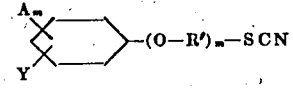

wherein R' represents an alkylene radical, Y represents a carboxylic radical containing 6 carbon atoms, A represents a member of the group consisting of halogen, alkyl, and hydrogen and $m$ is an integer not greater than 4, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

12. An insecticidal composition comprising an organic thiocyanate having the formula

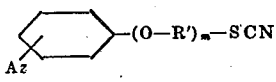

wherein R' represents an alkylene radical, A represents a member of the group consisting of halogen, alkyl, and hydrogen, $m$ is an integer not greater than 4, and $z$ is an integer not greater than 5, and a synthetic ether compound having the formula:

$$R—(O—C_nH_{2n})_m—X$$

wherein R represents an aromatic radical, $n$ is an integer from 2 to 6, inclusive, $m$ is an integer not greater than 4, and X is selected from the group consisting of chlorine, bromine, iodine, and the hydroxyl radical.

13. An insecticidal composition comprising an organic thiocyanate and a synthetic ether compound having the formula:

$$R—(O—C_nH_{2n})_m—OH$$

wherein R represents an aromatic radical, $n$ is an integer from 2 to 6, inclusive, and $m$ is an integer not greater than 4.

14. An insecticidal composition comprising an organic thiocyanate having the formula:

$$R—(O—C_nH_{2n})_m—SCN$$

wherein R represents an aromatic radical of the benzene series, $m$ is an integer not greater than 4, and $n$ is an integer from 2 to 6, inclusive, and a synthetic ether compound having the formula:

$$R—O—C_nH_{2n}—OH$$

wherein R represents an aromatic radical of the benzene series, and $n$ is an integer from 2 to 6, inclusive.

15. An insecticidal composition comprising an organic thiocyanate having the formula:

$$R—(O—C_nH_{2n})_m—SCN$$

wherein R represents an aromatic radical of the benzene series, $m$ is an integer not greater than 4, and $n$ is an integer from 2 to 6, inclusive; and a synthetic ether compound having the formula:

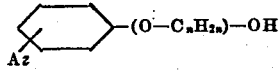

wherein A represents a member of the group consisting of halogen, alkyl, and hydrogen, $n$ is an integer from 2 to 6, inclusive, $m$ is an integer not greater than 4, and $z$ is an integer not greater than 5.

16. An insecticidal composition comprising an organic thiocyanate and beta-(4-tertiarybutylphenoxy)-ethanol.

17. An insecticidal composition comprising an organic thiocyanate and a synthetic ether compound having the formula:

$$R—(O—C_nH_{2n})_m—Cl$$

wherein R represents an aromatic radical, $n$ is an integer from 2 to 6, inclusive, and $m$ is an integer not greater than 4.

18. An insecticidal composition comprising an organic thiocyanate having the formula:

$$R—(O—C_nH_{2n})_m—SCN$$

wherein R represents an aromatic radical of the benzene series, $m$ is an integer not greater than 4, and $n$ is an integer from 2 to 6, inclusive, and a synthetic ether compound having the formula:

$$R—O—C_2H_4—O—C_2H_4—Cl$$

wherein R represents an aromatic radical of the benzene series.

19. An insecticidal composition comprising an organic thiocyanate having the formula:

$$R—(O—C_nH_{2n})_m—SCN$$

wherein R represents an aromatic radical of the benzene series, $m$ is an integer not greater than 4, and $n$ is an integer from 2 to 6, inclusive, and a synthetic ether compound having the formula:

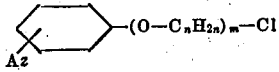

wherein A represents a member of the group consisting of halogen, alkyl, and hydrogen, $n$ is an integer from 2 to 6, inclusive, $m$ is an integer not greater than 4, and $z$ is an integer not greater than 5.

20. An insecticidal composition comprising an organic thiocyanate and beta-(2.4.6-trichlorophenoxy)-beta'-chloro-diethyl ether.

CLARENCE L. MOYLE.
FRED W. FLETCHER.